(12) United States Patent
Huffman et al.

(10) Patent No.: US 8,467,978 B2
(45) Date of Patent: Jun. 18, 2013

(54) IDENTIFYING FEATURES ON A SURFACE OF AN OBJECT USING WAVELET ANALYSIS

(75) Inventors: Michael David Huffman, Tacoma, WA (US); Andrew James Booker, Seattle, WA (US); Thomas A. Hogan, Seattle, WA (US); Alan K. Jones, Seattle, WA (US); Bruce C. Andrews, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 388 days.

(21) Appl. No.: 12/872,389

(22) Filed: Aug. 31, 2010

(65) Prior Publication Data

US 2012/0053854 A1    Mar. 1, 2012

(51) Int. Cl.
*G01B 21/20* (2006.01)
*G01B 21/30* (2006.01)
*B23Q 17/20* (2006.01)
*G06F 11/30* (2006.01)
*G06F 19/00* (2011.01)

(52) U.S. Cl.
USPC .............. 702/35; 33/533; 33/546; 73/105; 73/865.8; 700/109; 700/110; 700/175; 702/81; 702/167; 702/182; 702/187; 702/189; 708/200

(58) Field of Classification Search
USPC .............. 33/501, 503, 533, 545, 546; 73/104, 73/105, 865.8; 83/72, 73, 74; 356/2, 237.1, 356/237.2, 237.3, 237.4, 237.5, 600; 382/100, 382/108, 141, 145, 152; 700/90, 95, 108, 700/109, 110, 117, 159, 174, 175; 702/1, 702/33, 34, 35, 81, 82, 84, 127, 155, 167, 702/168, 182, 187, 189; 708/100, 105, 200

IPC ... B23C 9/00; B23Q 17/00,17/20; G01B 11/00, G01B 11/24, 11/30, 5/00, 5/20, 5/28, 21/00, G01B 21/20, 21/30; G06F 11/00, 11/30, G06F 11/32, 17/00, 17/40, 19/00
See application file for complete search history.

(56) References Cited

U.S. PATENT DOCUMENTS

| | | | |
|---|---|---|---|
| 5,390,536 A | 2/1995 | Zhang et al. | |
| 6,626,029 B2 * | 9/2003 | Dunegan | 73/105 |

(Continued)

FOREIGN PATENT DOCUMENTS

| | | |
|---|---|---|
| EP | 1248227 A2 | 10/2002 |
| JP | 2007292772 A | 11/2007 |

OTHER PUBLICATIONS

Torrence et al., "A Practical Guide to Wavelet Analysis", Bulletin of the American Meteorological Society, vol. 79, No. 1, Jan. 1998, pp. 61-78.

(Continued)

*Primary Examiner* — Edward Cosimano
(74) *Attorney, Agent, or Firm* — Yee & Associates, P.C.

(57) ABSTRACT

A method and apparatus for inspecting a surface of an object. Data from measuring the surface of the object is obtained to form surface data for the object. A range of frequencies for features on the object is selected based on a range of distances between adjacent peaks for the features. The features are formed by a tool moving along a number of paths. Desired surface data for the features is obtained from the surface data using the range of frequencies selected. A determination is made as to whether the desired surface data for the features meets a policy specifying a desired surface for the object. In response to an absence of a determination that the desired surface data for the features meets the policy, the object is reworked.

20 Claims, 10 Drawing Sheets

U.S. PATENT DOCUMENTS

| | | | | |
|---|---|---|---|---|
| 7,295,695 | B1* | 11/2007 | Dayal | 382/145 |
| 7,912,658 | B2* | 3/2011 | Biellak et al. | 702/40 |
| 8,144,337 | B2* | 3/2012 | Hamamatsu et al. | 356/600 |
| 8,175,819 | B2* | 5/2012 | Fujisawa | 702/35 |
| 8,269,960 | B2* | 9/2012 | Reich et al. | 356/237.5 |
| 8,310,665 | B2* | 11/2012 | Hamamatsu et al. | 356/237.1 |
| 2002/0036617 | A1 | 3/2002 | Pryor | |
| 2002/0112533 | A1* | 8/2002 | Dunegan | 73/104 |
| 2009/0031793 | A1 | 2/2009 | Koshy et al. | |
| 2009/0254855 | A1 | 10/2009 | Kretz et al. | |
| 2009/0281738 | A1 | 11/2009 | Fujisawa | |
| 2009/0290168 | A1* | 11/2009 | Hamamatsu et al. | 356/600 |
| 2009/0299655 | A1* | 12/2009 | Biellak et al. | 702/40 |
| 2010/0060888 | A1* | 3/2010 | Reich et al. | 356/237.5 |
| 2012/0162665 | A1* | 6/2012 | Hamamatsu et al. | 356/600 |

OTHER PUBLICATIONS

Raja et al., "Recent advances in separation of roughness, waviness and form", Precision Engineering Journal of the International Society for Precision Engineering and Nanotechnology 26 (2002) pp. 222-235.

Fu et al., "Engineering Surface Analysis with Different Wavelet Bases", Transactions of the ASME, Nov. 2003 vol. 125, pp. 844-852.

Lee et al., "Morphological Characterisation of Engineered Surfaces by Wavelet Transform", International Journal Mach. Tools Manufacturing, vol. 38, Nos. 5-6, 1998 Elsevier Science Ltd, pp. 581-589.

Chen et al., "Surface roughness evaluation by using wavelets analysis", Elsevier Science Inc., Precision Engineering 23 (1999) pp. 209-212.

PCT search report dated Oct. 18, 2011 regarding International application PCT/US2011/044077, International filing date Jul. 14, 2011, (11 Pages).

Josso et al., "Frequency normalised wavelet transform for surface roughness analysis and characterisation", WEAR, vol. 252, No. 5-6, Mar. 2002, pp. 491-500.

* cited by examiner

IDENTIFYING FEATURES ON A SURFACE OF AN OBJECT USING WAVELET ANALYSIS

BACKGROUND INFORMATION

1. Field

The present disclosure relates generally to manufacturing objects and, in particular, to inspecting objects. Still more particularly, the present disclosure relates to a method and apparatus for identifying features for an object.

2. Background

Objects, such as aircraft parts, are manufactured in a number of different ways. For example, parts may be formed by using molds, sintering, and machining. Machining includes the removal of materials from a workpiece. With machining, workpieces are processed using tools that remove these materials from the workpiece. These tools include, for example, without limitation, lathes, milling machines, drill presses, cutters, and other suitable tools. These tools are used to remove material from the workpiece to obtain the desired geometry or shape of the object. Machining may be used with objects comprised of materials, such as metal, wood, plastic, and/or other suitable materials.

Machining is often controlled using computer numerical control machines. These types of machines provide for increased accuracy in the manner in which machining may be performed. When machining involves moving a rotating cutting tool to bear against a workpiece, this type of operation is referred to as a milling operation. Milling operations are often used to produce large parts, such as landing gear for aircraft.

Milling operations and other types of machining processes may result in a surface having features that may not meet desired requirements. For example, when machining an object, a tool may be moved along parallel paths to remove materials from the object. Contact between the tool and the workpiece during movement of the cutting tool in the parallel paths may cause undesired features on the object. These undesired features may include an undesired roughness and/or an undesired waviness for the surface of the object. When using, for example, milling machines and/or cutting tools, the undesired roughness and waviness may be referred to as hemstitching or a scalloped pattern.

As a result, the parts may be reworked manually after machining to reduce and/or remove the undesired features for the surface of the object such that the surface may have a desired level of smoothness. This process may require many hours of rework. As a result, the time and expense in manufacturing a part using machining operations may be increased beyond what is desirable.

Therefore, it would be advantageous to have a method and apparatus that addresses one or more issues discussed above, as well as possibly other issues.

SUMMARY

In one advantageous embodiment, a method is provided for inspecting a surface of an object. Data from measuring the surface of the object is obtained to form surface data for the object. A range of frequencies for features on the object is selected based on a range of distances between adjacent peaks for the features. The features are formed by a tool moving along a number of paths. Desired surface data for the features is obtained from the surface data using the range of frequencies selected. A determination is made as to whether the desired surface data for the features meets a policy specifying a desired surface for the object. In response to an absence of a determination that the desired surface data for the features meets the policy, the object is reworked.

In another advantageous embodiment, an apparatus comprises a measurement tool and a computer system. The measurement tool is configured to measure a surface of an object to generate data for the object. The computer system is configured to obtain the data from the measurement tool to form surface data for the object. The computers system is configured to select a range of frequencies for features on the object based on a range of distances between adjacent peaks for the features. The computer system is configured to obtain desired surface data for the features from the surface data using the range of frequencies selected. The features are formed by a tool moving along a number of paths. The computer system is configured to indicate whether reworking of the object is needed based on the desired surface data.

In yet another advantageous embodiment, a method is provided for manufacturing an object. A workpiece is machined to form the object having a surface with features formed by a tool moving along a number of paths during the machining of the workpiece. The surface of the object is measured to obtain surface data for the object. A range of frequencies is selected for the features on the object based on a range of distances between adjacent peaks for the features. Desired surface data for the features is obtained from the surface data using the range of frequencies selected. A determination is made as to whether the surface of the object meets a policy specifying a desired surface for the object using the desired surface data. In response to an absence of a determination that the surface of the object meets the policy, the object is reworked such that the surface of the object meets the policy.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
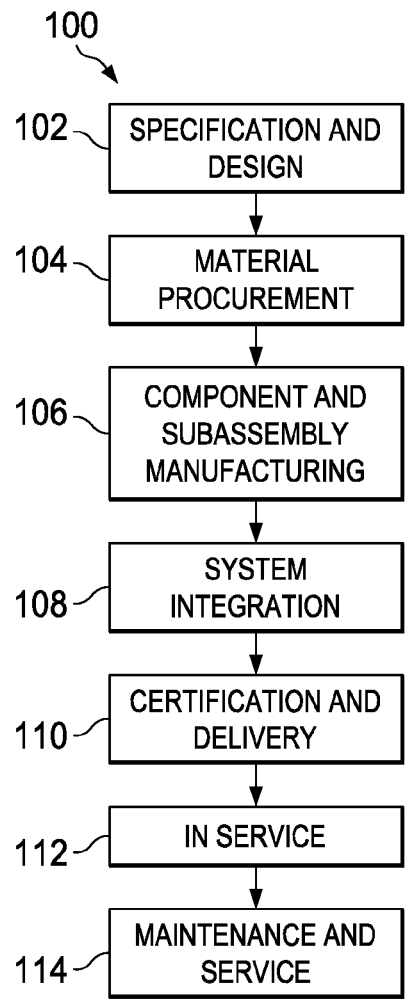
FIG. 1 is an illustration of an aircraft manufacturing and service method in accordance with an advantageous embodiment.
Figure 2:
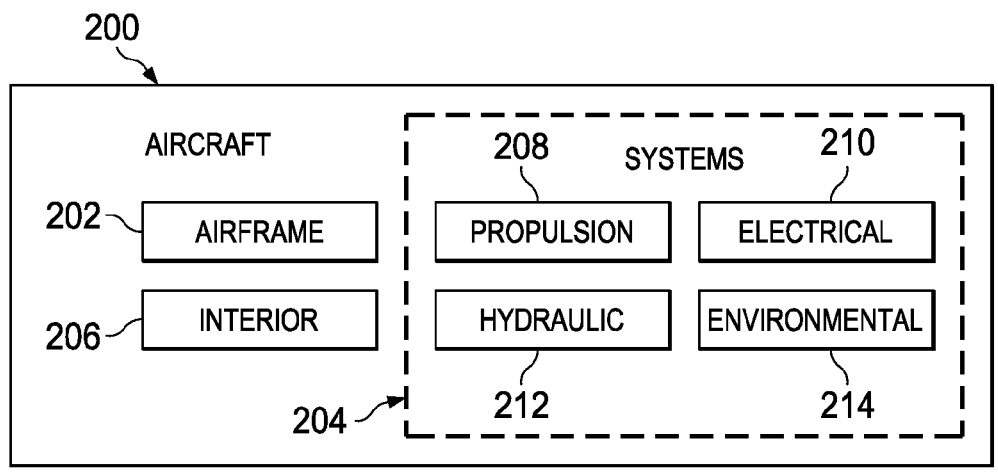
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that specifications may be developed for the features formed on a workpiece during the machining of the workpiece. These features may include a roughness of the surface of the workpiece, a waviness of the surface of the workpiece, a texture of the surface of the workpiece, a pattern for the surface of the workpiece, and/or other types of features.

Parameters for machining workpieces may be adjusted based on the specifications developed for the workpiece. For example, parameters for computer numerical control machines may be set to form a hemstitching pattern for the surface of a workpiece with a selected range of heights, widths, and/or depths for the hemstitching pattern.

The different advantageous embodiments recognize and take into account that when machining a workpiece, obtaining measurements for the roughness of a surface of the workpiece may be desired. These measurements may be used to determine whether the parameters for machining the workpiece need to be changed. The different advantageous embodiments recognize and take into account that different currently available measuring apparatus may be used to obtain these measurements.

For example, profilometers are often used to measure the roughness of a surface of an object. A profilometer is an instrument that is used to quantify a profile of a surface to identify the roughness of the surface. A mechanical profilometer may use a diamond stylus to move vertically and contact the surface of an object. This device may measure surface variations as a function of position.

The different advantageous embodiments recognize that mechanical profilometers may be sensitive to vibrations. Additionally, these types of devices are unable to measure contoured objects. In other words, an object with a surface that is not substantially flat cannot be measured with a desired accuracy. Thus, the use of mechanical profilometers may not be suitable for use in manufacturing facilities.

The different advantageous embodiments also recognize and take into account that profilometers using laser gauges may be used to obtain measurements for the surface of an object. These types of instruments may collect data about the surfaces of an object, including contoured surfaces. The data generated by these laser instruments are typically in the form of coordinate data for the surface of the part. The different advantageous embodiments recognize and take into account that this data may not have a desired accuracy with respect to contoured surfaces.

Thus, the different advantageous embodiments provide a method for inspecting a surface of an object. Data from measuring the surface of the object is obtained to form surface data for the object. A range of frequencies for features on the object is selected based on a range of distances between adjacent peaks for the features. The features are formed by a tool moving along a number of paths. Desired surface data for the features is obtained from the surface data using the range of frequencies selected. A determination is made as to whether the desired surface data for the features meets a policy identifying a desired surface for the object. In response to an absence of a determination that the desired surface data for the features meets the policy, the object is reworked.

Figure 3:
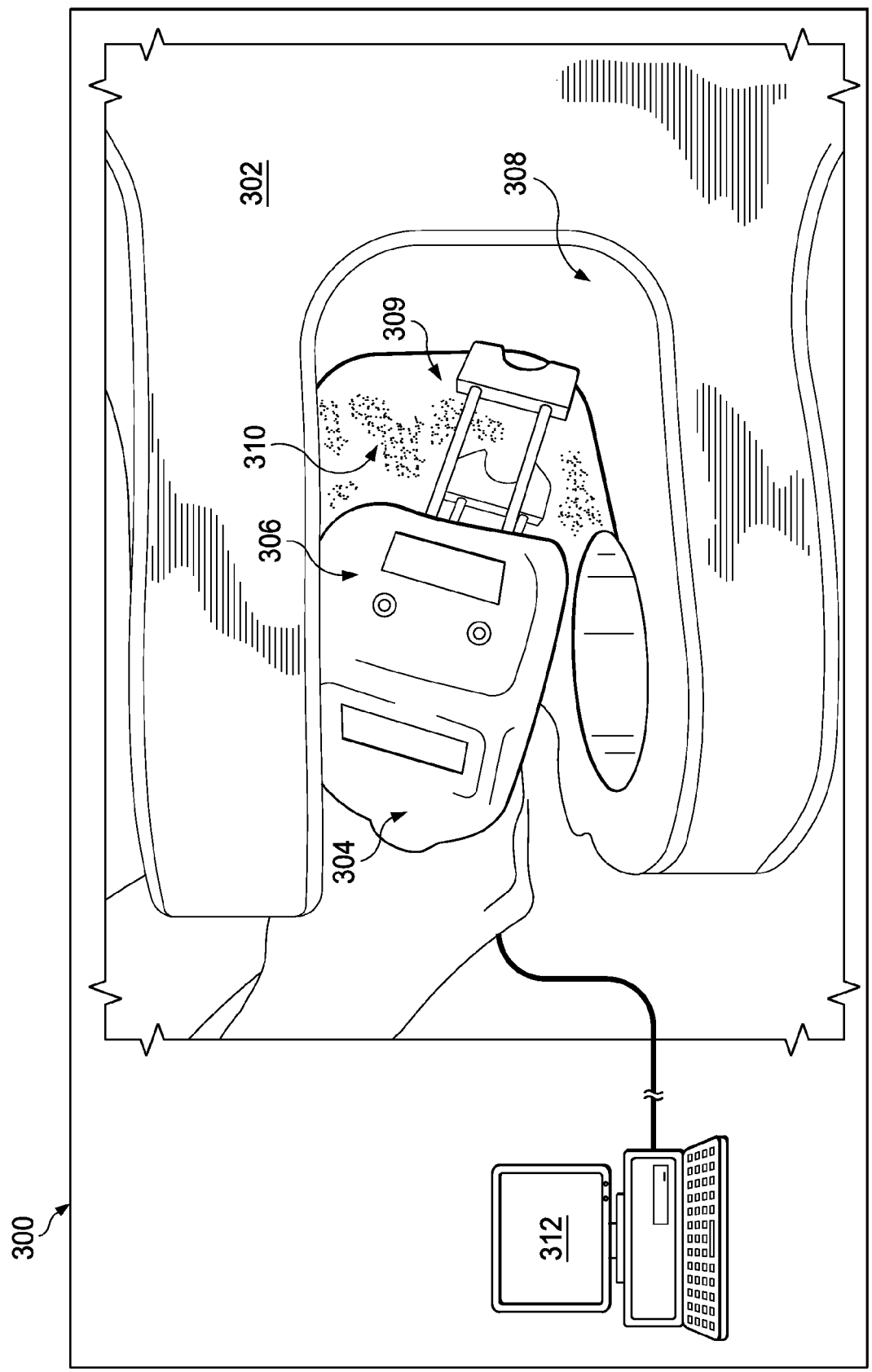
FIG. 3 is an illustration of a measurement environment in accordance with an advantageous embodiment.

With reference now to FIG. 3, an illustration of a measurement environment is depicted in accordance with an advantageous embodiment. Measurement environment 300 includes object 302 and tool 304. Object 302 may be a part for aircraft 200 in FIG. 2. Tool 304 takes the form of laser 306 in this illustrative example.

As depicted, object 302 has curved surface 308. Further, object 302 has features 309 on object 302. Features 309 are formed from machining of object 302. Features 309 include roughness 310 of curved surface 308.

In this illustrative example, laser 306 makes measurements for curved surface 308 and for features 309 on object 302. In these illustrative examples, the measurements for features 309 are made even though object 302 has curved surface 308 where features 309 are located on object 302. These measurements may be made during aircraft manufacturing and service method 100 in FIG. 1. For example, these measurements may be made during specification and design 102, material procurement 104, component and subassembly manufacturing 106, and/or other processes in aircraft manufacturing and service method 100 in FIG. 1.

In these examples, the measurements made by laser 306 are stored in computer 312. Computer 312 is configured to provide information about features 309 based on the measurements made using laser 306. This information includes, for example, without limitation, a roughness average, an average waviness value, a maximum amplitude of features, a maximum slope in the features, and/or other suitable information. This information may be used to determine whether the parameters for machining object 302 need to be changed. Further, this information may be used to identify properties for object 302, such as fatigue or aesthetic characteristics for object 302.

Figure 4:
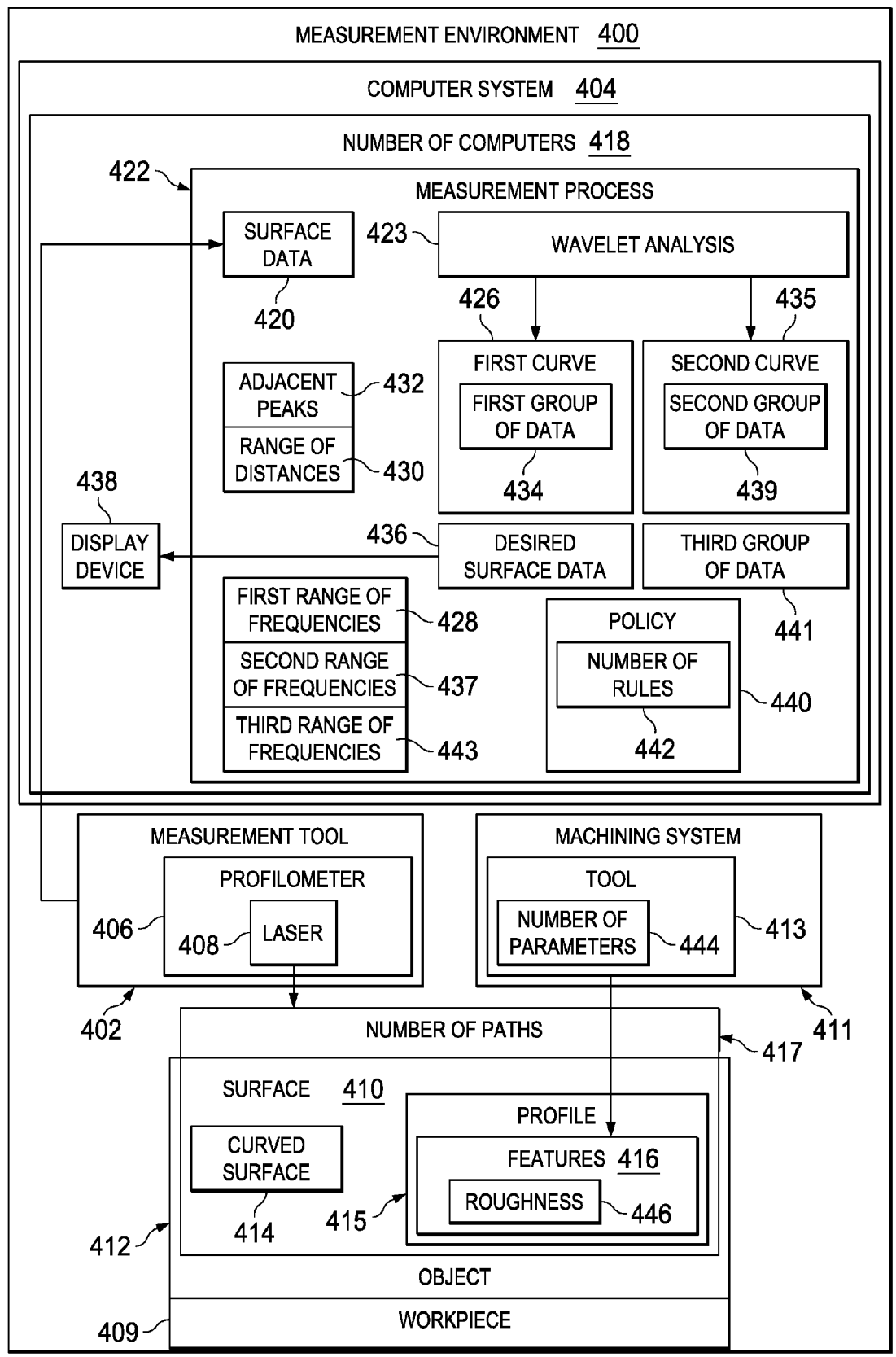
FIG. 4 is an illustration of a measurement environment in accordance with an advantageous embodiment.

Turning now to FIG. 4, an illustration of a measurement environment is depicted in accordance with an advantageous embodiment. Measurement environment 300 in FIG. 3 is an example of one implementation for measurement environment 400 in FIG. 4.

In these illustrative examples, measurement environment 400 includes measurement tool 402 and computer system 404. Measurement tool 402 is profilometer 406 in these illustrative examples. Profilometer 406 may be any instrument configured to measure a profile of an object. In these examples, profilometer 406 uses laser 408 to make measurements for surface 410 of object 412. For example, without limitation, profilometer 406 with laser 408 may be implemented using one of HS701 LASERGAUGE® DSP Sensor or HS710 LASERGAUGE® DSP Sensor available from Origin Technologies Corporation. Profilometer 406 may also be a mechanical profilometer, in some illustrative examples, implemented using Surftest SJ-401 available from Mitutoyo.

In these examples, object 412 may take various forms. For example, object 412 may be a partially-finished part, a finished part, a workpiece, or some other suitable type of object. As one illustrative example, object 412 may be a part machined from workpiece 409. In some illustrative examples, surface 410 may be curved surface 414.

Surface 410 has profile 415. Profile 415 is defined by the three-dimensional outline and shape of surface 410. Profile 415 may be formed from machining of object 412 in these illustrative examples. Machining of object 412 may be performed using any process for removing material from surface 410 of object 412. Machining of object 412 is performed using machining system 411. Machining system 411 includes tool 413 to remove materials from object 412.

In these illustrative examples, tool 413 may be a physical tool that comes in contact with surface 410. For example, tool 413 may be, without limitation, a milling machine, a cutting machine, a lathe, or some other suitable type of tool. Further, in some illustrative examples, tool 413 may be any type of tool that removes material from surface 410 of object 412 with or without contacting surface 410.

Features 416 on object 412 can be identified from profile 415 on surface 410. Features 416 are formed on object 412 during the machining of object 412 in these illustrative examples. In particular, features 416 are formed when tool 413 moves along number of paths 417 on object 412 during the machining of object 412. In these illustrative examples, features 416 are any deviations from a desired contour for surface 410. The desired contour for surface 410 may also be referred to as the desired form for surface 410. Still further, the desired contour may be a reference plane for surface 410.

In other illustrative examples, features 416 may be formed by depositing materials onto surface 410 of object 412. For example, materials may be deposited onto surface 410 and then cured. This curing may be performed by laser sintering the materials as the materials are added onto surface 410 to form features 416. As another example, features 416 may be formed by depositing layers of material onto surface 410 and curing the layers of material in, for example, an autoclave or an oven.

In these illustrative examples, if features 416 are greater than a desired threshold or range, these features may be undesirable. For example, if features 416 are greater than a desired threshold or range, these features may cause undesired characteristics for object 412.

Features 416 may include, for example, without limitation, a texture of surface 410, a roughness of surface 410, a waviness of surface 410, a pattern for surface 410, and/or other suitable types of features 416. In one illustrative example, features 416 form a hemstitching pattern or a scalloped pattern.

In these depicted examples, number of paths 417 may have a number of orientations. For example, number of paths 417 may include parallel paths, perpendicular paths, bi-directional paths, random paths, circular paths, concentric paths, radial paths, and/or other suitable types of paths.

Laser 408 makes measurements for surface 410 and features 416 on object 412. These measurements are stored in computer system 404 as surface data 420. Computer system 404 includes number of computers 418. In these illustrative examples, measurement process 422 runs on computer system 404 to obtain surface data 420 as measurements are generated by laser 408. In other illustrative examples, laser 408 may store the measurements until all measurements are completed. These measurements may then be sent to or transferred to computer system 404 as surface data 420.

As depicted, measurement process 422 processes surface data 420. In particular, measurement process 422 uses wavelet analysis 423 to identify first curve 426. Wavelet analysis 423 includes the separation of a group of data into multiple constituent groups. Each constituent group of data is a component of the group of data localized to particular spatial intervals and range of frequencies. In these illustrative examples, a group of data may be changed from a time domain to a time-frequency domain using wavelet analysis 423.

First curve 426 identifies a trend for surface data 420. A trend is a curve for a group of data generated using statistical analysis. For example, the trend may be a best-fit curve. Measurement process 422 uses first range of frequencies 428 to identify first curve 426. First range of frequencies 428 are selected for features 416 based on range of distances 430 between adjacent peaks 432 for features 416.

For example, without limitation, features 416 may be grooves in number of paths 417 along surface 410 that form a hemstitching pattern. In this example, range of distances 430 is the range for a distance between adjacent peaks 432 for the grooves in the hemstitching pattern. Range of distances 430 identifies a minimum distance and a maximum distance expected between adjacent peaks 432 based on the type of tool 413 used to machine object 412 and/or the parameters set for tool 413.

First range of frequencies 428 is identified by taking the reciprocal of the maximum distance to identify a maximum frequency for first range of frequencies 428. First range of frequencies 428 includes this maximum frequency and frequencies less than this maximum frequency.

In these illustrative examples, measurement process 422 identifies first group of data 434 in first curve 426. First group of data 434 includes data within first range of frequencies 428. Measurement process 422 removes first group of data 434 from surface data 420 to identify desired surface data 436. For example, measurement process 422 may subtract first group of data 434 from surface data 420.

Removing first group of data 434 from surface data 420 removes other data that may be undesired or not needed for analyzing features 416 on object 412. For example, the other data present that may be undesirable or not needed includes data identifying the contour of surface 410.

In these depicted examples, desired surface data 436 includes data for features 416 of surface 410. For example, desired surface data 436 includes data for the waviness of surface 410, the roughness of surface 410, and the texture of surface 410. In these examples, desired surface data 436 may be displayed on display device 438 in computer system 404.

In these illustrative examples, measurement process 422 may also use wavelet analysis 423 to identify second curve 435. Second curve 435 identifies a trend for desired surface data 436. Measurement process 422 uses second range of frequencies 437 to identify second curve 435. Second range of frequencies 437 is selected based on range of distances 430.

In particular, second range of frequencies 437 is selected using the minimum distance and maximum distance expected between adjacent peaks 432 based on the type of tool 413 used to machine object 412 and/or the parameters set for tool 413. The minimum frequency for second range of frequencies 437 is the reciprocal of the maximum distance expected for adjacent peaks 432. The maximum frequency for second range of frequencies 437 is the reciprocal of the minimum distance expected for adjacent peaks 432.

Measurement process 422 identifies second group of data 439 from second curve 435. Second group of data 439 is within second range of frequencies 437. Measurement process 422 removes second group of data 439 from desired surface data 436 to obtain third group of data 441.

Third group of data 441 is within third range of frequencies 443. Third range of frequencies 443 includes all frequencies greater than second range of frequencies 437. Further, third group of data 441 includes data for noise caused by operation of tool 413 and data for roughness of surface 410 having a high frequency. This high frequency is within third range of frequencies 443.

Additionally, desired surface data 436 and/or second curve 435 may be analyzed using policy 440. Policy 440 includes number of rules 442. These rules identify desired specifications of features 416. In this manner, policy 440 identifies a desired surface for surface 410. These rules may be selected based on desired aesthetics or appearance for surface 410. These desired specifications may be used to determine whether features 416 are acceptable or if rework of object 412 is needed to reduce and/or remove the presence of features 416 on object 412.

Reworking of object 412 may include, for example, without limitation, re-machining object 412 using machining system 411, sanding surface 410 of object 412, burnishing object 412, and/or performing other suitable types of rework operations. Further, in some cases, reworking of object 412 may include discarding workpiece 409 used to form object 412 and machining a new workpiece to form object 412 with the desired surface specified in policy 440.

Further, based on the identification of whether features 416 are suitable, number of parameters 444 for machining system 411 may be set or adjusted. For example, if surface data 420 is obtained from object 412 as a result of machining object 412 using machining system 411 with number of parameters 444, changes to number of parameters 444 may be made to obtain the desired specifications for features 416.

For example, if roughness 446 is greater than desired, an analysis of desired surface data 436 may be made to determine what adjustments may be made to number of parameters 444. Adjustments to number of parameters 444 may be made, and a second object may be machined using machining system 411. Additional data may then be obtained and analyzed to determine whether the roughness of the second object falls within the desired levels of roughness with the change in number of parameters 444.

In these illustrative examples, number of parameters 444 may include a speed of operation for tool 413, a speed of movement along number of paths 417, a diameter of tool 413, an orientation for tool 413 during operation of tool 413, and/or other suitable parameters.

Although three groups of data are identified using measurement process 422 in these examples, other numbers of groups of data may also be analyzed. For example, desired surface data 436 may be processed to form additional groups of data. Wavelet analysis 423 may then be used to form additional curves for these additional groups of data. In some illustrative examples, third group of data 441 may not be formed.

The illustration of measurement environment 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, measurement tool 402 may include a processor unit to analyze surface data 420. With this type of implementation, measurement process 422 may run on measurement tool 402. In other advantageous embodiments, measurement tool 402 may be a laser instrument that is not referred to as a profilometer.

In yet other advantageous embodiments, machining system 411 may not be used. Instead, measurement environment 400 may only be used to determine whether objects meet desired specifications for features formed on the objects. For example, measurement environment 400 may be used in quality control and inspection of object 412.

As a more specific example, measurement tool 402 and measurement process 422 may be used to measure profile 415 for surface 410 of object 412 to determine whether profile 415 meets selected requirements. If profile 415 does not meet these selected requirements, object 412 may be reworked and re-measured using measurement tool 402. This process may be repeated until profile 415 meets the selected requirements.

Further, in some illustrative examples, measurement tool 402 and measurement process 422 may be used during the machining process to detect issues in the machining process as the issues arise. For example, measurement process 422 may identify undesired features in surface 410 of object 412 during the machining process. These undesired features may indicate that tool 413 used to machine object 412 may need to be replaced or repaired. As yet another example, measurement process 422 may identify undesired features in surface 410 as materials are added onto surface 410 to form features 416.

Still further, in other advantageous embodiments, other methods for changing data from a time domain to a time-frequency domain may be used in addition to or in the place of wavelet analysis 423.

Figure 5:
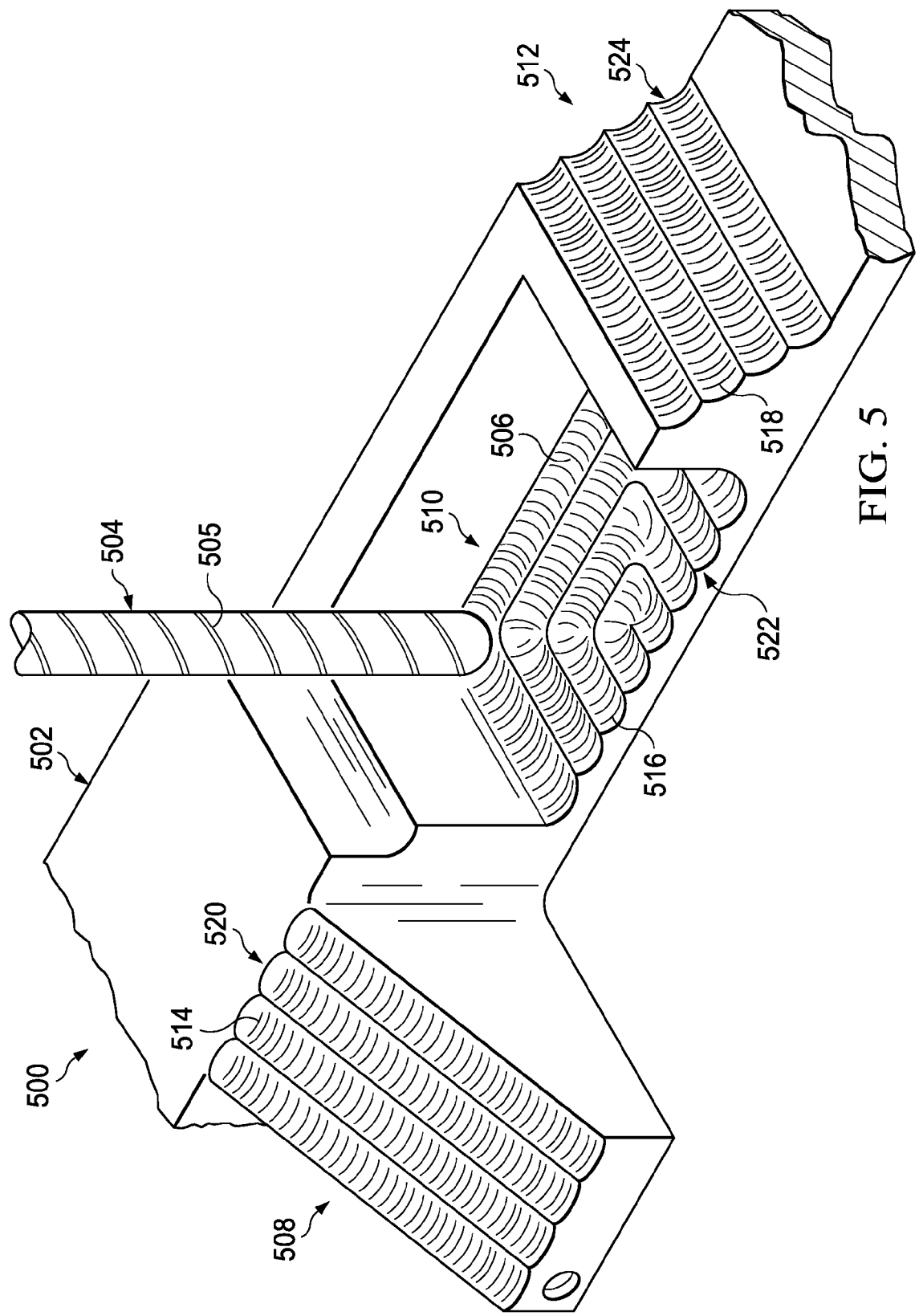
FIG. 5 is an illustration of a machining environment in accordance with an advantageous embodiment.

With reference now to FIG. 5, an illustration of a machining environment is depicted in accordance with an advantageous embodiment. In this illustrative example, machining environment 500 includes workpiece 502 and tool 504. Workpiece 502 is an example of object 412 in FIG. 4. Tool 504 is an example of tool 413 for machining system 411 in FIG. 4.

In this depicted example, tool 504 is used to machine workpiece 502. Tool 504 is a milling tool. The milling tool may be, for example, a ball nose end mill, a bull nose end mill, a face mill, or some other type of milling tool. In this illustrative example, tool 504 is ball nose end mill 505.

As depicted, workpiece 502 has surface 506. Surface 506 includes different regions that have been machined using tool 504. Surface 506 includes machined region 508, machined region 510, and machined region 512. These regions have features 514, features 516, and features 518, respectively. Further, in this illustrative example, features 514, features 516, and features 518 are grooves that form hemstitching pattern 520, hemstitching pattern 522, and hemstitching pattern 524, respectively. The grooves for these hemstitching patterns are formed when tool 504 is moved along paths on workpiece 502.

Figure 6:
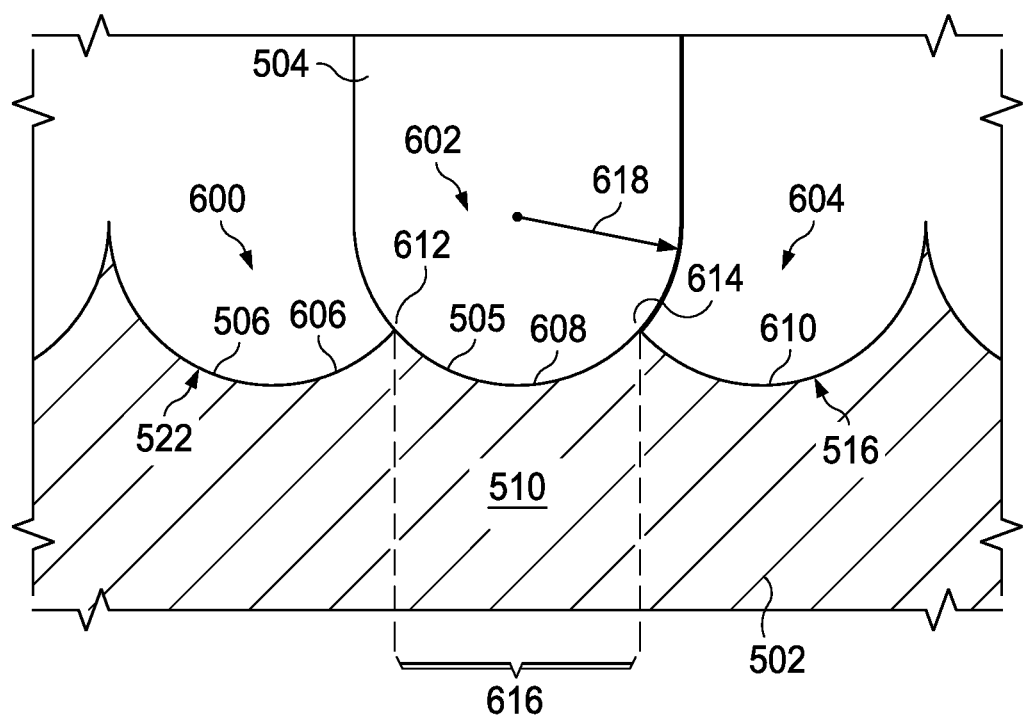
FIG. 6 is an illustration of a side view of a machined region of a surface of an object in accordance with an advantageous embodiment.

With reference now to FIG. 6, an illustration of a side view of a machined region of a surface of an object is depicted in accordance with an advantageous embodiment. In this illustrative example, a side view of machined region 510 of surface 506 of workpiece 502 is presented. Further, a portion of features 516 for hemstitching pattern 522 in machined region 510 are seen for object 502.

As depicted in this example, tool 504 has ball nose end mill 505 with radius 618. Tool 504 has moved along paths 600, 602, and 604 to form grooves 606, 608, and 610, respectively. Grooves 606, 608, and 610 are part of features 516 formed for workpiece 502. Peak 612 is present between groove 606 and groove 608, and peak 614 is present between groove 608 and groove 610.

In this illustrative example, radius 618 for tool 504 and the stepover distances for features 516 in machined region 510 determine hemstitched pattern 522. A stepover distance is the distance between adjacent peaks for grooves in this illustrative example. For example, stepover distance 616 is the distance between peak 612 and peak 614.

Different stepover distances may be presented between adjacent peaks for hemstitching pattern 522 in FIGS. 5 and 6. The range of stepover distances expected for hemstitching pattern 522 is based on the type of tool 504 used to machine workpiece 502 and on the parameters set for tool 504. This expected range of stepover distances is an example of range of distances 430 in FIG. 4 that may be used by measurement process 422 in FIG. 4.

Measurements for surface 506 of workpiece 502 may be made to obtain surface data. The surface data may be processed by the measurement process to provide desired surface data. The desired surface data may then be processed and analyzed to provide information about surface 506 and features 516.

The information provided may be used to determine whether changes to the parameters for machining the workpiece are needed to meet desired specifications. For example, paint may be applied to the surface of an aircraft part after machining of the aircraft part. The surface of the aircraft part may have a hemstitched pattern. A smaller stepover distance, as compared to stepover distance 616, may be needed such that the hemstitching pattern is not visible through the paint after the paint is applied. Further, a tool with a smaller radius, as compared to radius 618, may be needed such that the hemstitching pattern is not visible through the paint.

Figure 7:
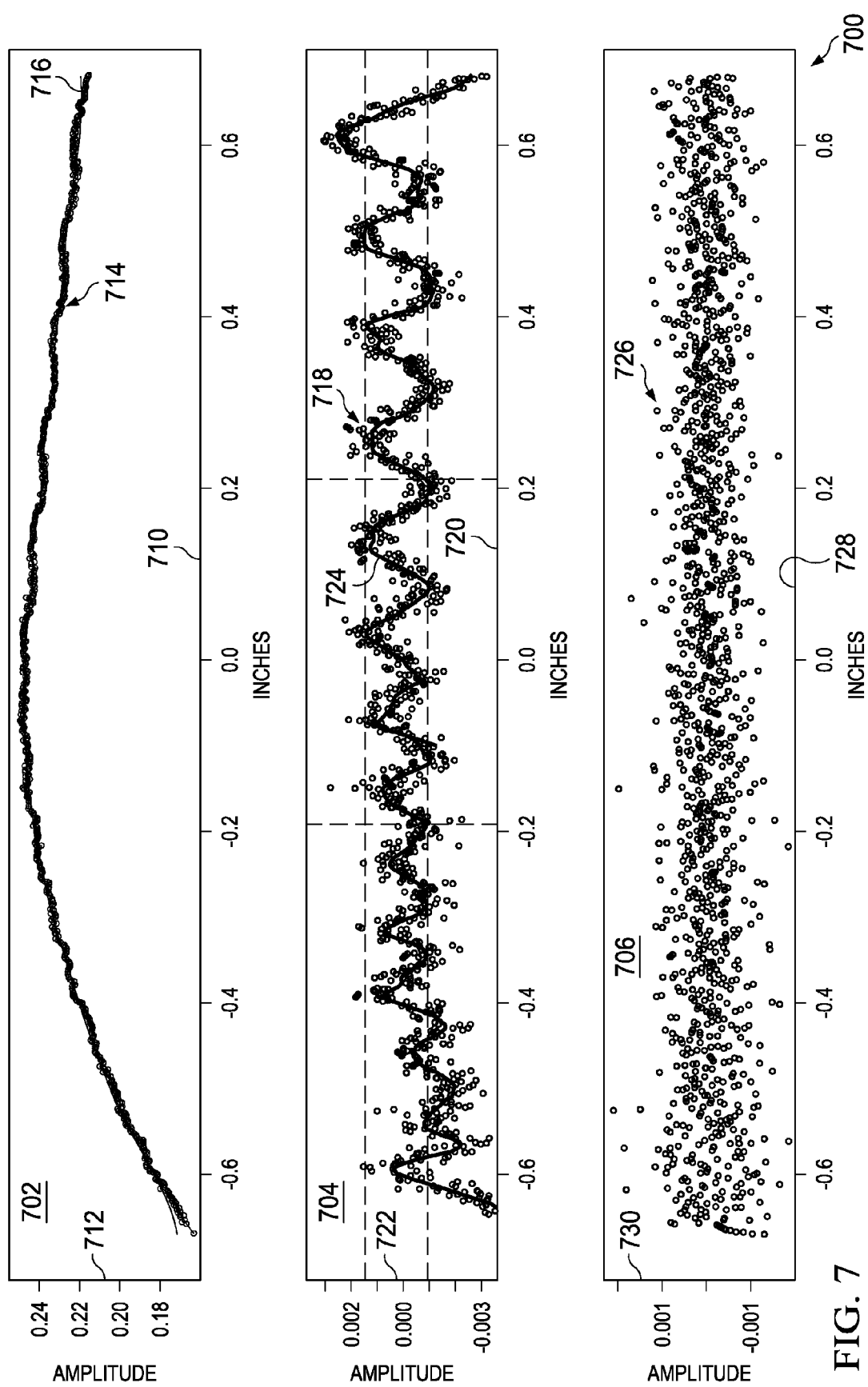
FIG. 7 is an illustration of data for the surface of an object in accordance with an advantageous embodiment.

With reference now to FIG. 7, an illustration of data for the surface of an object is depicted in accordance with an advantageous embodiment. In this illustrative example, data 700 includes graph 702, graph 704, and graph 706.

As depicted, graph 702 has horizontal axis 710 and vertical axis 712. Horizontal axis 710 identifies locations along a surface of an object. Vertical axis 712 identifies deviations of the surface of the object from a reference plane. Both horizontal axis 710 and vertical axis 712 are in inches in this illustrative example.

Graph 702 identifies surface data 714. Surface data 714 is an example of one implementation for surface data 420 in FIG. 4. For example, surface data 714 may be obtained from measurements made using a measurement tool, such as measurement tool 402 in FIG. 4. These measurements may be for a surface, such as, for example, surface 410 and features 416 in FIG. 4.

First curve 716 in graph 702 is an example of one implementation for first curve 426 in FIG. 4. First curve 716 may be identified by, for example, measurement process 422 using wavelet analysis 423 in FIG. 4. A first group of data in first curve 716 is subtracted from surface data 714 to generate desired surface data. This desired surface data is presented as desired surface data 718 in graph 704. Desired surface data 718 is an example of one implementation for desired surface data 436 in FIG. 4.

Graph 704 has horizontal axis 720 and vertical axis 722. Horizontal axis 720 in graph 704 has the same range as horizontal axis 710 in graph 702. Vertical axis 722 in graph 704 has a smaller range as compared to vertical axis 712 in graph 702. This smaller range results from subtracting the first group of data in first curve 716 from surface data 714. Both horizontal axis 720 and vertical axis 722 are in inches.

The measurement process uses wavelet analysis to identify second curve 724. Second curve 724 is an example of one implementation for second curve 435 in FIG. 4. Analysis of second curve 724 may provide information about the surface of the object and the features on the object. This information may include, for example, without limitation, a roughness average, an average of waviness, a roughness scale, a value for the steepest slope of second curve 724, and/or other suitable types of information.

Additionally, the information provided by analysis of second curve 724 and/or desired surface data 718 may provide information about an average maximum height for the profile of the object, an average maximum profile peak height, a maximum roughness depth, a mean spacing between profile irregularities, a maximum profile valley depth, and/or other suitable types of information.

In this illustrative example, a second group of data in second curve 724 is subtracted from desired surface data 718 to obtain a third group of data. This third group of data is presented in graph 706 as third group of data 726. Third group of data 726 includes noise caused by operation of the measurement tool and roughness with frequencies above the frequencies used to identify second curve 724.

As depicted, graph 706 has horizontal axis 728 and vertical axis 730. Horizontal axis 728 has the same range as horizontal axis 720 in graph 704 and as horizontal axis 710 in graph 702. Vertical axis 730 has a smaller range as compared to vertical axis 722 in graph 704 and vertical axis 712 in graph 702.

Figure 8:
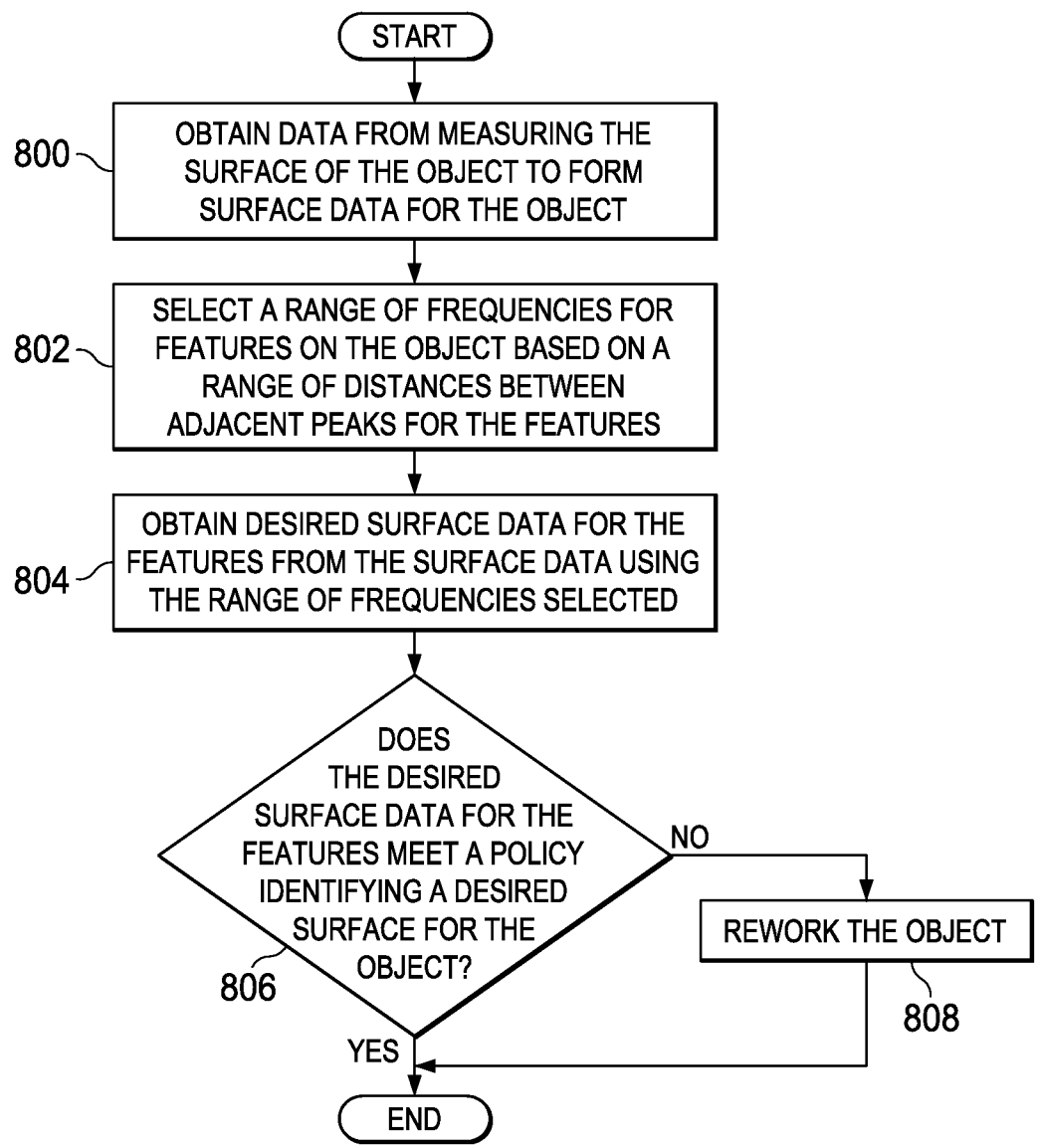
FIG. 8 is an illustration of a flowchart of a process for identifying data for the surface of an object in accordance with an advantageous embodiment.

With reference now to FIG. 8, an illustration of a flowchart of a process for inspecting the surface of an object is depicted in accordance with an advantageous embodiment. The process illustrated in FIG. 8 may be implemented in measurement environment 400 in FIG. 4. This process may be implemented using measurement process 422 in FIG. 4.

The process begins by obtaining data from measuring the surface of the object to form surface data for the object (operation 800). The process then selects a range of frequencies for features on the object based on a range of distances between adjacent peaks for the features (operation 802). In operation 802, the range of distances may be a range for expected stepover distances for the features.

The features are formed by a tool moving along a number of paths. For example, the features may be formed by the tool moving along the number of paths during at least one of machining of the object and depositing materials onto the surface of the object.

Thereafter, the process obtains desired surface data for the features from the surface data using the range of frequencies selected (operation 804). The process then determines whether the desired surface data for the features meets a policy identifying a desired surface for the object (operation 806). The policy may be, for example, policy 440 in FIG. 4.

The step of obtaining the desired surface data for the features from the surface data using the range of frequencies selected may further include changing the surface data from a time domain into a time-frequency domain, wherein the surface data has frequency components, and selecting a number of frequency components from the frequency components using the range of frequencies selected for the features to form the desired surface data for the features.

If the desired surface data for the features meets the policy, the process terminates. Otherwise, the process reworks the object (operation 808), with the process terminating thereafter. In the different advantageous embodiments, the process illustrated in FIG. 8 may be repeated until the desired surface data for the features meets the policy in operation 806.

Figure 9:
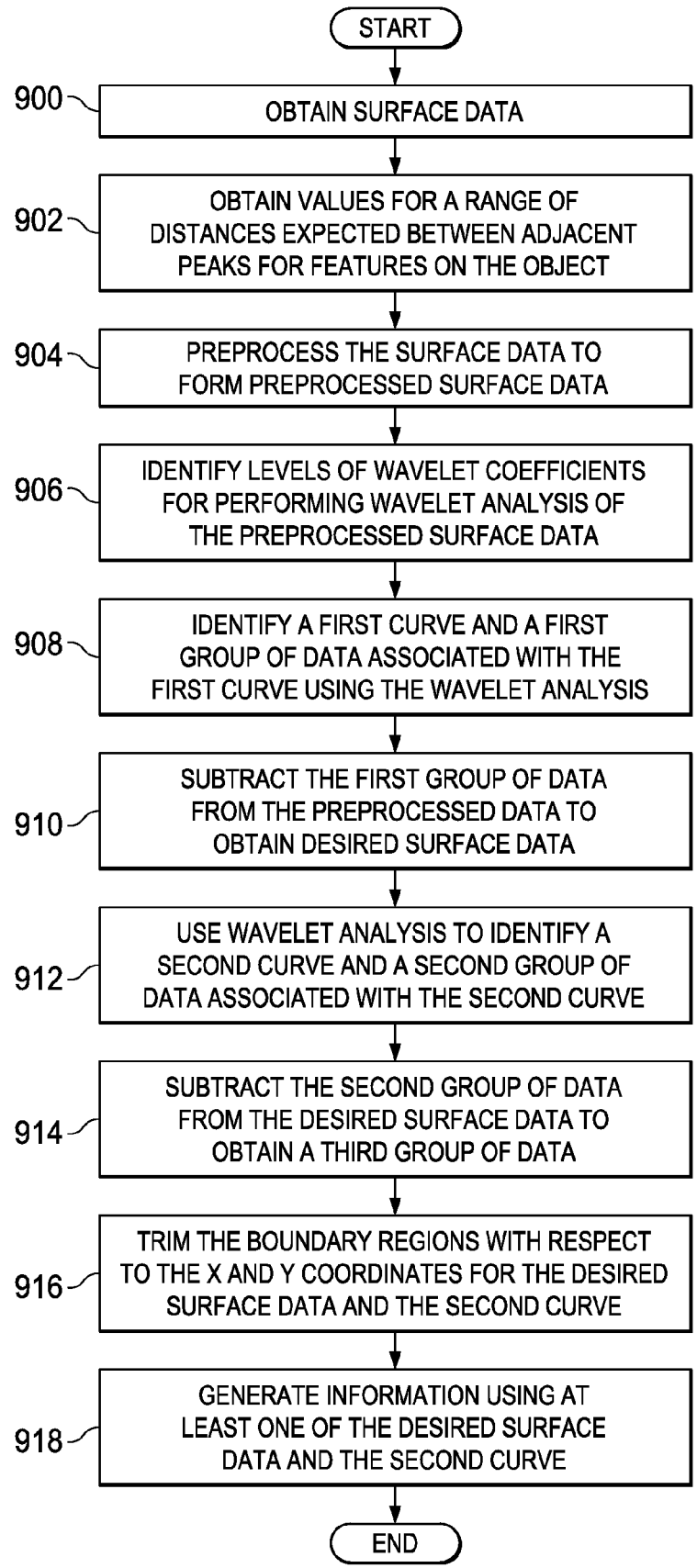
FIG. 9 is an illustration of a flowchart of a process for identifying data for the surface of an object in accordance with an advantageous embodiment.

With reference now to FIG. 9, an illustration of a flowchart of a process for identifying data for the surface of an object is depicted in accordance with an advantageous embodiment. The process illustrated in FIG. 9 may be implemented in measurement environment 400 in FIG. 4. This process is a more detailed process for the process illustrated in FIG. 8. Further, this process may be implemented using measurement process 422 in FIG. 4.

The process begins by obtaining surface data (operation 900). This surface data may be obtained from measurements made using a measurement tool. The measurement tool may be, for example, laser 408 in FIG. 4.

A laser provides coordinate data for the surface data. This coordinate data includes X, Y coordinate data. The X values correspond to locations on a surface of an object at which the measurements are made. The Y values correspond to the profile of the surface of the object. Further, the Y values may be used to identify deviations from a desired contour for the surface.

In some illustrative examples, a measurement tool may only provide Y values. The X values may be generated by the measurement process using a known scan width for the measurement tool. The scan width is the interval in distance at which the measurement tool makes measurements.

The process then obtains values for a range of distances expected between adjacent peaks for features on the object (operation 902). In this illustrative example, these values may be obtained by receiving user input identifying these values. In some illustrative examples, these values may be obtained using a database or table. The distance between two adjacent peaks is also referred to as a stepover distance.

Thereafter, the surface data is preprocessed to form preprocessed surface data (operation 904). Preprocessing of the surface data includes trimming the surface data and ensuring that the X values are substantially equally spaced. Additionally, preprocessing of the surface data includes filling in any gaps in the surface data using interpolation techniques.

The process then identifies levels of wavelet coefficients for performing wavelet analysis of the preprocessed surface data (operation 906). In this illustrative example, wavelet analysis includes expressing the preprocessed surface as a linear combination of functions. A linear combination of functions is a sum of constant multiples of the functions. This linear combination of functions is formed by dilating or contracting spatial shifts of a mother wavelet.

In particular, wavelet analysis expresses the preprocessed surface data in the form:

$$\sum_{i,j} c_{i,j} \psi(2^i t - j). \tag{1}$$

where $c_{ij}$ are the wavelet coefficients, i is an index for a frequency range, j is an index for a spatial interval, $\psi$ is the mother wavelet, and t is time. Each wavelet coefficient is the amplitude of the preprocessed surface data in a particular spatial interval and frequency range.

Further, the range of values for the index, i, depend on the size of preprocessed surface data. This range of values is between i=0 to i=$\log_2$ N, where N is the number of data points in preprocessed surface data. The range of values for the index, j, is all integers. In these examples, the spatial intervals represented by the index, i, may overlap. However, the frequency ranges represented by the index, j, do not overlap.

In operation 906, the levels of wavelet coefficients correspond to the values for the index, i. In operation 906, a first level and second level of wavelet coefficients are identified. The first level is the level above which the wavelet coefficients selected approximate the contour of the surface of the object. The second level of wavelet coefficients is the level below which the wavelet coefficients approximate noise caused by the operation of the measurement tool and high frequency roughness.

The first level and second level of wavelet coefficients are identified based on a range of frequencies selected for performing the wavelet analysis. The range of frequencies is selected by taking the reciprocals of a minimum wavelength and a maximum wavelength for a range of wavelengths. The range of wavelengths is identified based on the range of distances expected between adjacent peaks for the features.

For example, an average interval between the data points in the preprocessed surface data with respect to the X coordinate is identified as follows:

$$dx = (X_n - X_1)/n \quad (2)$$

where dx is the average interval between the data points in the preprocessed surface data with respect to the X coordinate, and n is the number of data points in the preprocessed surface data.

The minimum wavelength in the range of wavelengths is identified as follows:

$$\lambda_{min} = (\text{minimum distance})/dx \quad (3)$$

where $\lambda_{min}$ is the minimum wavelength in the range of wavelengths, and minimum distance is the minimum distance in the range of distances expected between adjacent peaks.

The maximum wavelength in the range of wavelengths is identified as follows:

$$\lambda_{max} = (\text{maximum distance})/dx \quad (4)$$

where $\lambda_{max}$ is the maximum wavelength in the range of wavelengths, and maximum distance is the maximum distance in the range of distances expected between adjacent peaks.

Taking the reciprocal of the minimum wavelength gives the maximum frequency for the range of frequencies. Taking the reciprocal of the maximum wavelength gives the minimum frequency for the range of frequencies. This range of frequencies is used to identify the levels of wavelet coefficients in operation 906.

Thereafter, the process uses wavelet analysis to identify a first curve and a first group of data associated with the first curve (operation 908). In operation 908, the first curve is identified using frequencies below the range of frequencies identified in operation 906. The first curve represents the contour of the surface of the object. In these examples, the first group of data is associated with the first curve by being part of the data within the first curve.

The process then subtracts the first group of data from the preprocessed data to obtain desired surface data (operation 910). The desired surface data contains data for the features of the surface of the object.

The process uses wavelet analysis to decompose the desired surface data to identify a second curve and a second group of data associated with the second curve (operation 912). In operation 912, the second curve is identified using frequencies within the range of frequencies identified in operation 906. The second curve represents the features on the object. For example, the second curve may represent a hemstitching pattern, a scalloped pattern, or some other suitable pattern on the surface of the object. The second curve also represents the roughness and waviness of the surface of the object.

Thereafter, the process subtracts the second group of data from the desired surface data to obtain a third group of data (operation 914). The third group of data comprises data representing noise caused by operation of the measurement tool and fine detail roughness of the surface. Fine detail roughness is roughness of the surface at frequencies above the range of frequencies identified in operation 906. In this manner, the surface data obtained in operation 900 is decomposed into three groups of data.

The process then trims the boundary regions with respect to the X and Y coordinates for the desired surface data and the second curve (operation 916). Operation 916 is performed to ensure that the data has a desired accuracy and dependability. Of course, in other illustrative examples, other methods for ensuring the data has a desired accuracy and dependability may be used in operation 916 in addition to or in place of trimming the boundary regions.

Thereafter, the process generates information using at least one of the desired surface data and the second curve (operation 918), with the process terminating thereafter. The information generated in operation 918 may include, for example, without limitation, a roughness average, a roughness scale, a waviness average, and/or other suitable types of information.

In this illustrative example, wavelet analysis identifies a wavelet transform. For example, in operation 912, the wavelet transform identified for the desired surface data is defined using the following:

$$c_{j+1}(k) = \sum_n h(n-2k)c_j(n) \quad (5)$$
$$w_{j+1}(k) = \sum_n g(n-2k)c_j(n)$$

where in equation set (5), w(k) are wavelet coefficients, where j is an index for the step in analysis for identifying the wavelet transform, k is an index for the data point, and n is a bound variable. Further, in equation set (5), g is the impulse response of the high pass filter associated with the discrete wavelet transform associated with the mother wavelet, and h is the impulse response of the low pass filter associated with the discrete wavelet transform associated with the mother wavelet.

Still further, in equation set (5), when j=0, $c_o(k)$ is the k-th data point in the desired surface data. When j is greater than 0, $c_j(k)$ corresponds to the data left in the desired surface data after the j-th step of analysis. For example,
if h=(0.5, 0.5) and g=(−0.5, 0.5),
then $c_0$=(1, 2, 4, 1, −1, −1, −2, 0),
$c_1$=(1.5, 2.5, −1.0, −1.0),
$w_1$=(0.5, −1.5, 0.0, 1.0),
$c_2$=(2.0, −1.0), $w_2$=(0.5, 0.0), and
$c_3$=(0.5), $w_3$=(−1.5).

The wavelet sequence, $w_j$, at level j captures information at frequencies substantially between $2^{-1}$ and $2^{1-j}$. If the scan width is $\Delta x$ and the effective stepover distance is between $s_{min}$ and $s_{max}$, then wavelet levels $w_m$ through $w_n$ capture the hemstitching pattern are:

$$m = \left\lfloor \log_2\left(\frac{s_{min}}{\Delta x}\right) \right\rfloor \text{ and } n = \left\lceil \log_2\left(\frac{s_{max}}{\Delta x}\right) \right\rceil \quad (6)$$

where m is the first level of wavelet coefficients, and n is the second level of wavelet coefficients.

Figure 10:
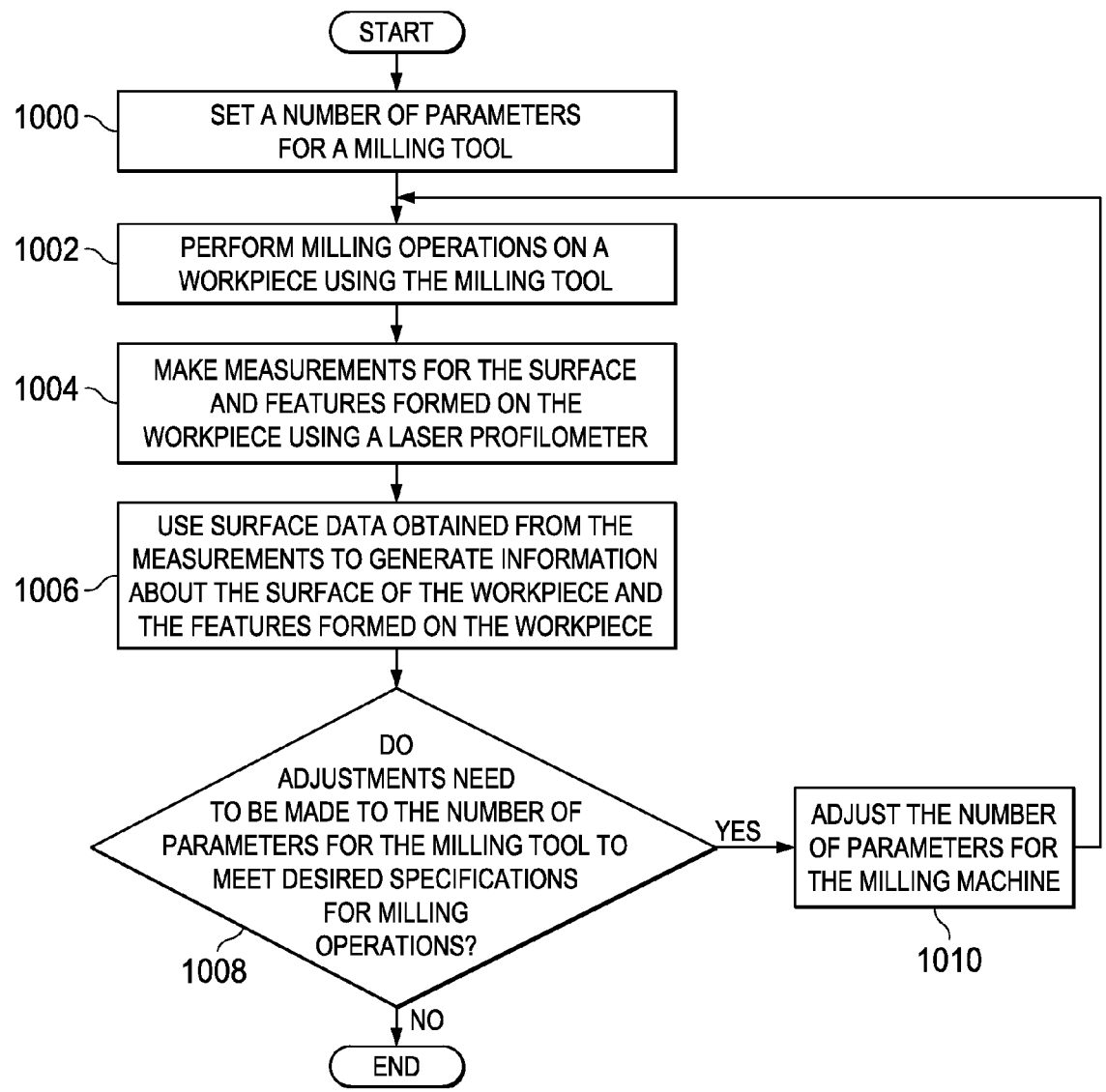
FIG. 10 is an illustration of a flowchart of a process for performing milling operations on a workpiece in accordance with an advantageous embodiment.

With reference now to FIG. 10, an illustration of a flowchart of a process for performing milling operations on a workpiece is depicted in accordance with an advantageous embodiment. The process illustrated in FIG. 10 may be implemented in measurement environment 400 in FIG. 4.

The process begins by setting a number of parameters for a milling tool (operation 1000). The number of parameters may include, for example, without limitation, a speed of operation, a speed of movement for the milling tool, a diameter of an end of the milling tool, a stepover distance, a depth of cut, and/or other suitable parameters.

Thereafter, the process performs milling operations on a workpiece using the milling tool (operation 1002). In operation 1002, the milling tool is moved along a number of paths over the workpiece. The milling tool contacts the workpiece during this movement and removes materials from the workpiece.

The process then makes measurements for the surface and features formed on the workpiece using a laser profilometer (operation 1004). The features may include grooves in the number of paths followed by the milling tool. These grooves may form a hemstitching pattern in these examples.

Next, the process uses surface data obtained from the measurements to generate information about the surface of the workpiece and the features formed on the workpiece (operation 1006). Operation 1006 may be performed using the process described in FIG. 9.

The process then determines whether adjustments need to be made to the number of parameters for the milling tool to meet desired specifications for milling operations (operation 1008). The desired specifications may be for a desired appearance of the surface of the workpiece, a desired performance of the workpiece, a desired life of the workpiece, and/or other suitable factors.

If adjustments are not needed, the process terminates. Otherwise, the process adjusts the number of parameters for the milling machine (operation 1010). Thereafter, the process returns to operation 1002 as described above to perform milling operations on a second workpiece using the adjusted number of parameters.

Figure 11:
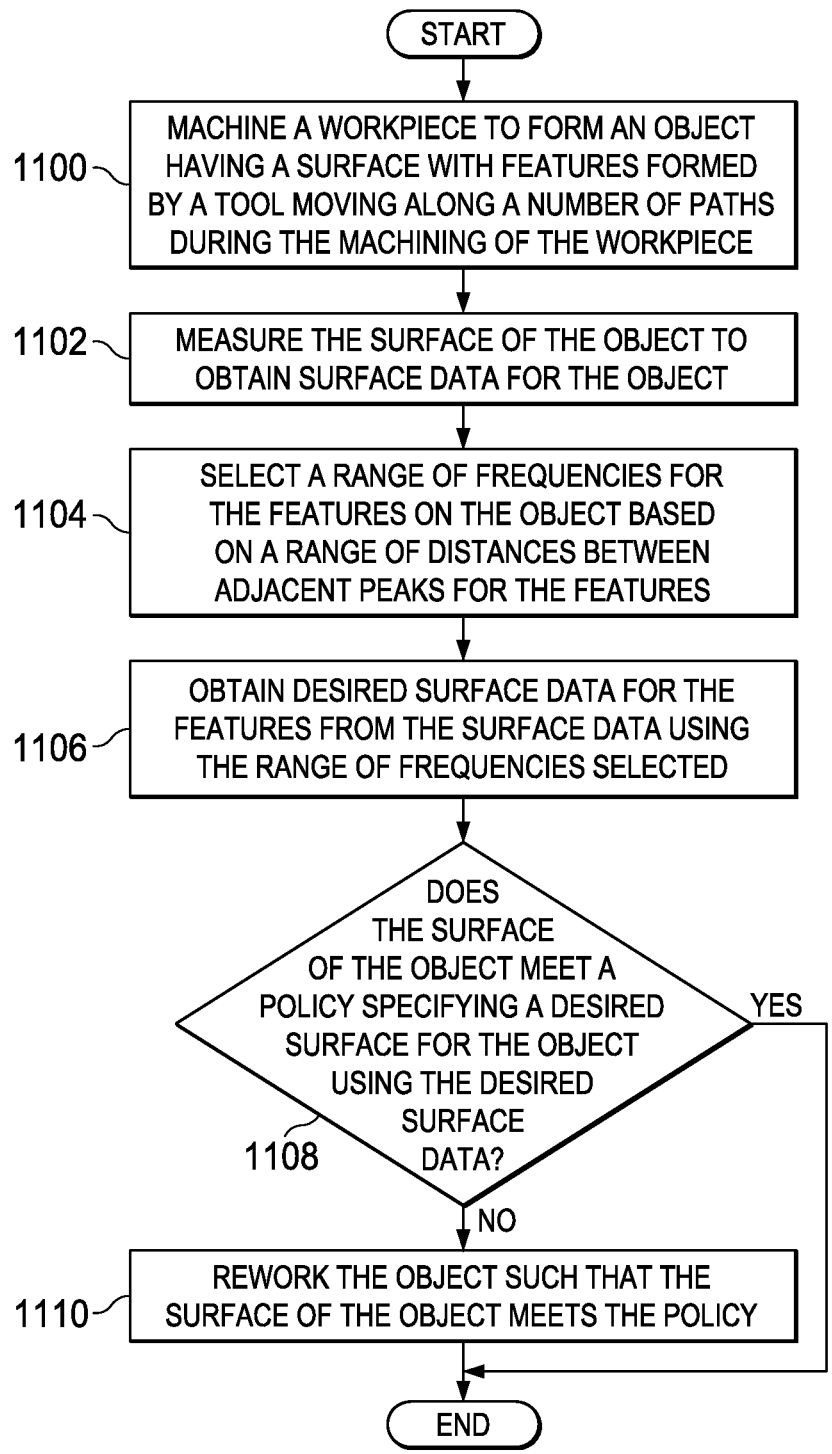
FIG. 11 is an illustration of a flowchart of a process for manufacturing an object in accordance with an advantageous embodiment.

With reference now to FIG. 11, an illustration of a flowchart of a process for manufacturing an object is depicted in accordance with an advantageous embodiment. The process illustrated in FIG. 11 may be implemented in measurement environment 400 in FIG. 4.

The process begins by machining a workpiece to form the object having a surface with features formed by a tool moving along a number of paths during the machining of the workpiece (operation 1100). The workpiece may be machined using, for example, machining system 411 in FIG. 4. The tool may be moved along the number of paths during the machining of the workpiece to form at least one of a hemstitched pattern and a scalloped pattern.

Next, the process measures the surface of the object to obtain surface data for the object (operation 1102). Operation 1102 may be performed using a measurement tool, such as measurement tool 402 in FIG. 4. The measurement tool may generate data for the surface of the object that is sent to a computer system, such as computer system 404 in FIG. 4. The computer system uses the data to form surface data for the object.

Thereafter, the process selects a range of frequencies for the features on the object based on a range of distances between adjacent peaks for the features (operation 1104). The process then obtains desired surface data for the features from the surface data using the range of frequencies selected (operation 1106). Next, the process determines whether the surface of the object meets a policy specifying a desired surface for the object using the desired surface data (operation 1108).

If the surface of the objects meets the policy specifying the desired surface for the object, the process terminates. Otherwise, the process reworks the object such that the surface of the object meets the policy (operation 1110), with the process terminating thereafter. The reworking of the object in operation 1110 may be performed by at least one of re-machining the object, sanding the object, burnishing the object, and/or performing other suitable operations to rework the object. Further, the object may be reworked by discarding the workpiece from which the object was formed and machining a new workpiece to form the object.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus to identify data for the surface of an object. Data from measuring the surface of an object is obtained to form surface data for the object. A range of frequencies for features on the object are selected based on a range of distances between adjacent peaks for the features. The features are formed by a tool moving along a number of paths. Desired surface data is obtained for the features from the surface data using the range of frequencies selected.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting a surface of an object, the method comprising:
   obtaining data from measuring the surface of the object to form surface data for the object;
   selecting a range of frequencies for features on the object based on a range of distances between adjacent peaks for the features, wherein the features are formed by a tool moving along a number of paths;
   obtaining desired surface data for the features from the surface data using the range of frequencies selected;
   determining whether the desired surface data for the features meets a policy identifying a desired surface for the object; and
   responsive to an absence of a determination that the desired surface data for the features meets the policy, reworking the object.

2. The method of claim 1, wherein the desired surface data comprises the data about the features for the object.

3. The method of claim 1, wherein the features for the object include a texture of the surface, a roughness of the surface, and a waviness of the surface.

4. The method of claim 1, wherein the range of distances is a range of stepover distances for the features from machining of the object.

5. The method of claim 1, wherein the step of obtaining the desired surface data for the features from the surface data using the range of frequencies selected comprises:
   changing the surface data from a time domain into a time-frequency domain, wherein the surface data has frequency components; and selecting a number of frequency components from the frequency components using the range of frequencies selected for the features to form the desired surface data for the features.

6. The method of claim 1, wherein the step of obtaining the data from measuring the surface of the object to form the surface data for the object comprises:
moving a laser beam from a laser over the surface of the object; and
measuring changes in depth as the laser beam moves over the surface of the object.

7. The method of claim 1, wherein the features are formed by the tool moving along the number of paths during at least one of machining the object and depositing materials onto the surface of the object.

8. The method of claim 1, wherein the step of obtaining the desired surface data for the features from the surface data using the range of frequencies selected comprises:
identifying a first group of data from the surface data; and
removing the first group of data from the surface data to form the desired surface data.

9. The method of claim 8, wherein removing the first group of data from the surface data to form the desired surface data comprises:
subtracting the first group of data from the surface data to form the desired surface data, wherein the first group of data contains the data about a contour of the surface of the object.

10. The method of claim 8, wherein the step of identifying the first group of data from the surface data comprises:
identifying a curve using wavelet analysis and the surface data; and
identifying the first group of data associated with the curve.

11. The method of claim 8 further comprising:
identifying a curve using wavelet analysis and the desired surface data;
identifying a second group of data associated with the curve; and
removing the second group of data from the desired surface data to form a third group of data.

12. An apparatus comprising:
a measurement tool configured to measure a surface of an object to generate data for the object; and
a computer system configured to obtain the data from the measurement tool to form surface data for the object; select a range of frequencies for features on the object based on a range of distances between adjacent peaks for the features, wherein the features are formed by a tool moving along a number of paths; obtain desired surface data for the features from the surface data using the range of frequencies selected; and indicate whether reworking of the object is needed based on the desired surface data.

13. The apparatus of claim 12 further comprising:
a machining system configured to rework the object in response to an indication by the computers system that reworking of the object is needed.

14. The apparatus of claim 12, wherein the features are formed by the tool moving along the number of paths during at least one of machining the object and depositing materials onto the surface of the object.

15. The apparatus of claim 12, wherein in being configured to obtain the desired surface data for the features from the surface data using the range of frequencies selected, the computer system is configured to change the surface data from a time domain into a time-frequency domain, wherein the surface data has frequency components; and select a number of frequency components from the frequency components using a selected range of frequencies for the features to form the desired surface data for the features.

16. The apparatus of claim 12, wherein in being configured to obtain the desired surface data for the features from the surface data using the range of frequencies selected, the computer system is configured to identify a first group of data from the surface data; and remove the first group of data from the surface data to form the desired surface data.

17. The apparatus of claim 16, wherein in being configured to identify the first group of data from the surface data, the computer system is configured to identify a curve using wavelet analysis and the surface data; and identify the first group of data associated with the curve.

18. The apparatus of claim 16, wherein the computer system is further configured to identify a curve using wavelet analysis and the desired surface data; identify a second group of data associated with the curve; and remove the second group of data from the desired surface data to form a third group of data.

19. A method for manufacturing an object, the method comprising:
machining a workpiece to form the object having a surface with features formed by a tool moving along a number of paths during the machining of the workpiece;
measuring the surface of the object to obtain surface data for the object;
selecting a range of frequencies for the features on the object based on a range of distances between adjacent peaks for the features;
obtaining desired surface data for the features from the surface data using the range of frequencies selected;
determining whether the surface of the object meets a policy specifying a desired surface for the object using the desired surface data; and
responsive to an absence of a determination that the surface of the object meets the policy, reworking the object such that the surface of the object meets the policy.

20. The method of claim 19, wherein the step of reworking the object comprises at least one of re-machining the object, sanding the object, and burnishing the object.

* * * * *